May 20, 1958
A. I. APPLETON
2,835,722
DRAINABLE ENCLOSURE FOR EXPLOSION-PROOF
ELECTRICAL SYSTEMS
Filed Oct. 19, 1954
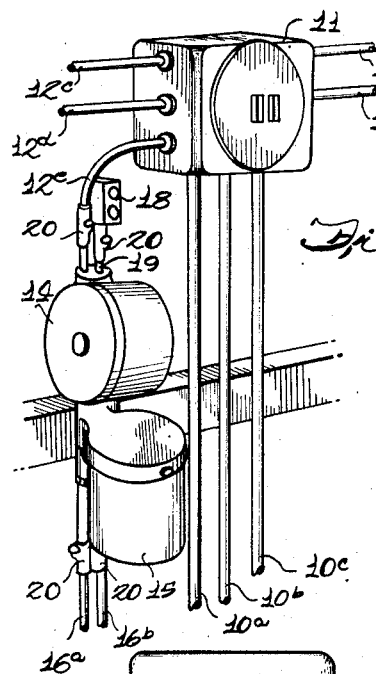
Fig. 1.
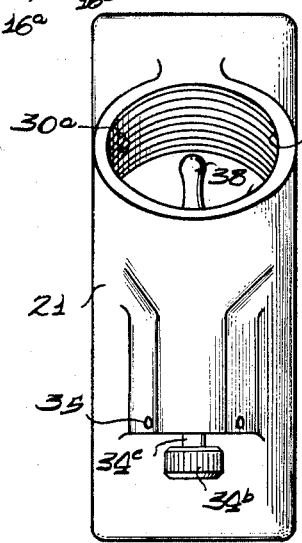
Fig. 3.
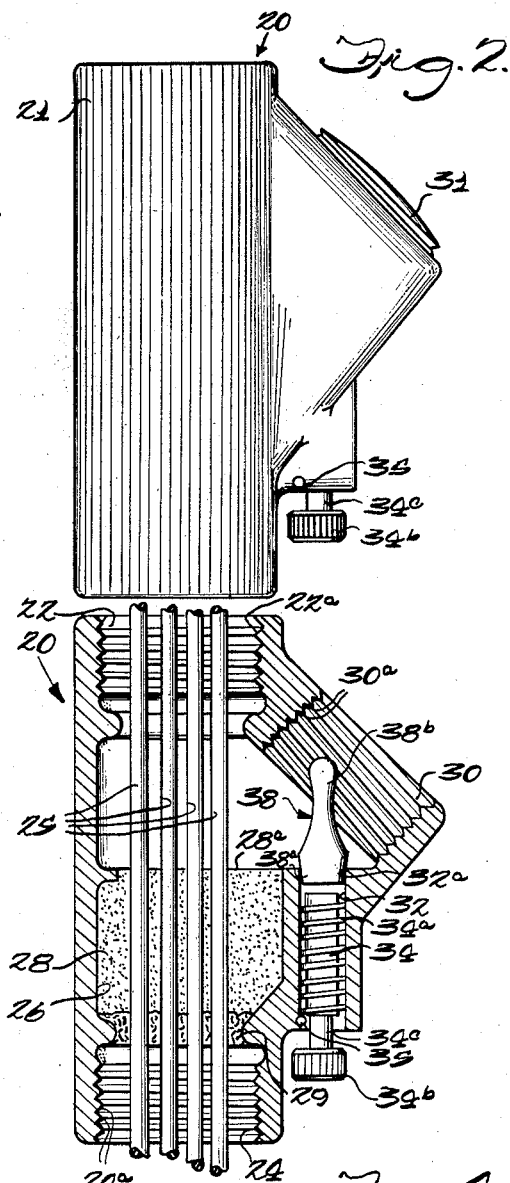
Fig. 2.
Fig. 4.
Inventor
Arthur I. Appleton
by Carlson, Pitzner, Hubbard & Wolfe
Attorneys

# United States Patent Office 2,835,722
Patented May 20, 1958

2,835,722

DRAINABLE ENCLOSURE FOR EXPLOSION-PROOF ELECTRICAL SYSTEMS

Arthur I. Appleton, Northbrook, Ill.

Application October 19, 1954, Serial No. 463,182

1 Claim. (Cl. 174—50)

The present invention relates in general to enclosures for explosion-proof electrical systems, and in particular to drainable enclosures intended to isolate adjacent sections of explosion-proof systems by means of sealing compound or the like placed in sealing wells.

In factories and laboratories where, owing to the nature of the work, explosive atmospheres may be present, it is necessary that all electrical apparatus including wiring, motors, relays, and the like be enclosed in conduits and housings so constructed and connected that electrical sparks, such as may occur upon operation of relay contacts and motor brushes, or upon failure of insulation, cannot ignite the external atmosphere. As a practical matter it is impossible to prevent the seepage of explosive vapors from the exterior to the interior of such conduits and housing, even though they are relatively air-tight. Thus, while an electric spark may create an explosion within the enclosure, protection against external explosions is obtained by either of two provisions. In the first provision, the enclosures, i. e., conduits and housings and connections therebetween, are made so strong and tight that they may physically withstand and contain the pressures of any internal explosion which might occur. In the second provision, long tortuous paths are created between the interior and exterior of the enclosures such that gases under pressure of an internal explosion may escape, but in the process are cooled to such an extent that the external atmosphere is not ignited. Of the two provisions, the latter is preferred because it permits the use of lighter and weaker enclosing conduits and housings, and makes possible the continuous drainage (as opposed to the periodic drainage by momentarily opening drain cocks) of moisture which inevitably collects within the enclosure system.

In order to prevent an internal explosion occurring at one point from progressing throughout the whole system and possibly damaging all of the inter-connected electrical apparatus, adjacent sections of the system are preferably mutually isolated from one another. Thus, for example, if an explosion occurs within a motor housing, it is confined to such housing and inter-connected starters, circuit breakers, or transformers, for example, are not damaged. One of the most convenient and widely used means for isolating adjacent sections of an explosion-proof system is the provision of sealing wells in various ones of the inter-connected enclosures which receive quantities of paste-like, self-hardening and insulating sealing compound, such as resinous plastic or cement. This compound solidifies and seals around conductors which pass through the sealing well and which thus electrically communicate between physically isolated sections of the system.

It is the general aim of the present invention to provide an enclosure for use in explosion-proof systems of the type described which is adapted to afford drainage of internally condensed moisture without interference from sealing compound.

More specifically, it is an object of the invention to provide an explosion-proof enclosure or fitting in which the upper surface of solidified sealing compound forms the floor upon which internal moisture collects, yet in which means are provided for preventing blockage of a drain passage opening downward from such floor by sealing compound even though the latter might be carelessly placed in the sealing well or filled to a level greater than normal.

A further object is to provide such an explosion-proof enclosure or fitting having drain means for removing condensed moisture which, by relatively simple and inexpensive provisions is protected against inadvertent clogging of the drain by sealing compound.

Other objects and advantages will become apparent as the following description proceeds, taken in conjunction with the accompanying drawing, in which:

Figure 1 illustrates a part of an explosion-proof electrical system employing enclosures or fittings embodying features of the invention;

Fig. 2 is a side elevation of the exemplary explosion-proof enclosure illustrated in Fig. 1;

Fig. 3 is a front elevation of the enclosure shown in Fig. 2, the closure member for a filling opening being omitted for clarity; and Fig. 4 is a vertical section of the exemplary enclosure.

While the invention has been shown and is described in some detail with reference to a particular embodiment thereof, there is no intention that it be limited to such detail. On the contrary, the intention here is to cover all alterations, modifications, and equivalents falling within the spirit and scope of the invention as defined by the appended claim.

Referring now to the drawings, Figure 1 illustrates a typical explosion-proof electrical system in which enclosures embodying the invention find particularly advantageous use. In the system here shown, heavy explosion-proof conduits 10a–c, housing power supply conductors (not shown), lead into a junction box 11. Smaller conduits 12a–e, containing feeder conductors, extend from the junction box 11 to various load devices such as electric motors, heaters or the like. For illustrative purposes the feeder conduit 12e is shown as coupled to an explosion-proof housing 14 for a protective circuit breaker (not visible). The housing 14, in turn, is connected with an explosion-proof casing 15 for an electric motor starter (not visible) and from which additional conduits 16a—b extend for connection with an explosion-proof motor (not shown). A control switch 18 is connected with the housing 14 by means of another conduit 19 containing suitable wiring.

The junction box 11, housing 14, casing 16 and switch 18 are all of explosion-proof construction, and have the various conduits connected thereto by explosion-proof couplings. In accordance with the practices previously mentioned, these components have their interiors physically isolated to localize any internal explosion which might occur. Further, drain means are provided to afford removal of moisture or liquid from each isolated section. These latter provisions are made in the present case by the insertion of novel enclosures or fittings 20 in the various conduits. The enclosures 20 are constructed to embody the features of the invention to be more fully described below; and while such enclosures are shown by way of example as fittings which house electrical conductors and serve as connectors for successive sections of conduit, it is to be understood that the invention may be used to advantage in various other enclosures which have sealing wells.

With further reference to Figs. 2, 3 and 4, each of the enclosures 20 is illustrated as a Y-type conduit fitting comprising a hollow fitting body 21 having an upper opening or entrance 22 and a lower opening or exit 24. The exit and entrance are so located as to permit the passage of electrical conductors 25 therethrough and are adapted for explosion-proof connection to heavy wall conduit as by internal threads 22a and 24a, respectively. Means are provided within the fitting body 21 and between the entrance and exit 22, 24 for defining a sealing well indicated generally at 26 and adapted to receive a quantity of sealing compound 28, such as an inert cement. The sealing compound is initially paste-like in form and initially supported in the well 26 by suitable plastic wadding 29. Once the sealing compound has hardened, it serves to support the conductors 25 in mutually spaced relation, and at the same time to physically isolate the entrance 22 and the exit 24.

Provision is made for filling the sealing well 26 with a suitable quantity of the compound 28 through an adjacent closable filling opening. For this purpose in the illustrated enclosure, means are provided in the fitting body 21 which define an angled filling opening 30 slightly above the sealing well 26. The filling opening is adapted for explosion-proof closure by means of a removable closure member, here shown as a threaded plug 31 adapted for cooperative engagement with internal threads 30a. Simply by removing the closure plug 31 therefore, the installer may place the wadding 29 in the lower portion of the sealing well, supply a suitable quantity of sealing compound 28 through the opening 30 to the well 26, and then reclose the opening 30 by screwing in the threaded plug 31.

With the sealing compound 28 hardened in place, its upper surface 28a forms the "floor" of the enclosed space. Condensed moisture will collect on this floor and is desirably drained in order to maintain good insulation between the conductors 25. In order to effect such draining and yet maintain the explosion-proof properties of the fitting 20, means are provided within the fitting body 21 to define a vertical drain passage 32 adjacent the sealing well 26. To assure that all of the moisture will flow into the drain passage, its upper end or opening is located below, or no higher than, the level to which sealing compound 28 is to be filled in the sealing well 26.

Means are provided in the drain passage 32 for permitting the drainage of moisture but preventing the escape of hot gases and flame therethrough. While such means may take the form of a manually opened and closed drain cock, it is here illustrated as a cylindrical baffle member 34 formed with external spiral threads 34a which snugly but slidably engage the side walls of the drain passage 32. The baffle member 34 may be loosely supported within the passage 32, by means of a stop pin 35, so that its upper end is somewhat below the upper mouth of the passage. This permits limited vertical displacement of the member 34 simply by pressing upwardly on an enlarged fingerpiece 34b depending from a reduced diameter shank 34c. Such vertical movement of the baffle member 34 serves to clear the spiral drain passage created by the threads 34a of any foreign material which might clog it. Such an explosion-proof drain arrangement is shown and claimed in United States Patent 2,405,927, issued on the application of Nils A. Tornblom, to which further reference may be made. Briefly, however, it may be mentioned that the spiral space between the body of the baffle member 34 and the walls of the drain passage 32 affords a free path for the slow, continuous drainage of moisture from within the fitting body. However, the spiral threads 34a create a long tortuous path from the upper to the lower end of the drain passage 32 which serves to prevent the escape of flame through such passage in the event of an explosion within the fitting body. While gases under pressure resulting from such an explosion may escape through the spiral drain path, they are so cooled in traveling the lengthened distance that they cannot ignite an external explosive atmosphere.

Where space is limited within an explosion-proof fitting of the type shown, it is possible that as sealing compound is supplied through the filling opening 30 to the sealing well 26, some of the compound may inadvertently find its way into the mouth or upper end of the drain passage 32. Additionally, in the event that the sealing well 26 is inadvertently filled beyond the normal level intended, some of the sealing compound might spill over into the drain passage 32. This could clog the drain passage and might possibly prevent the effective drainage of condensed moisture therethrough.

In accordance with the invention, means are provided which are readily and removably inserted through filling opening 30 into closing relation with the mouth or upper end of the drain passage 32. With such means in place, therefore, sealing compound cannot enter and clog the drain passage 32 as the sealing well 26 is being filled. After the well is filled and the sealing compound hardened, such means may be removed to open the drain passage 32 and render it operative, the explosion-proof integrity of the fitting being then completed by replacement of the closure plug 31.

As here illustrated, such means for preventing accidental clogging of the drain passage is in the form of a removable stopper, preferably an elongated resilient plug 38 made of rubber or the like which is insertable into the mouth 32a of the drain passage 32. The plug is formed at its lower end 38a with a slightly tapered configuration so that it may be tightly wedged in the upper end of the passage 32; and it is preferably of sufficient length so that its upper end 38a may be held by the fingers while it is being inserted into or removed from the passage 32 through the filling opening 30. The upper end 38a is readily visible through the filling opening 30 so that, in addition to serving as a "handle," it serves as an indicator for warning an inspector that the plug has not been removed to render the drain operative. The chances of inadvertently leaving the plug in the fitting after the sealing is complete are thus greatly reduced.

In installing the explosion-proof fitting 21, the conductors 25 are first passed through the entrance 22, the sealing well 26, and the exit 24. The cooperating conduits may then be coupled into the exit and entrance by engagement with the threads 22a and 24a respectively. With the closure plug 31 removed, the installer next inserts the wadding 29 in the bottom of the sealing well 26, taking care to see that the conductors 25 are adequately separated from one another. Next, the rubber plug 38 is inserted into the upper end of the drain passage 32, closing the latter so that sealing compound cannot accidentally clog it. The sealing compound 28 is then supplied through the filling opening 30 into the sealing well 26, due care being taken to see that the upper surface 28a of the sealing compound is no lower than the upper end of the drain passage 32a so that a puddle cannot remain on such surface when the installation is complete. After hardening of the sealing compound 28, the rubber plug 38 is removed through the opening 30, and the closure plug 31 screwed into place. With this, the installation is complete, the fitting 20 being closed in a manner to prevent the escape of hot gases or flames from its interior in the event of an internal explosion. Condensed moisture or other liquid collecting on the upper surface 28a of the sealing compound 28 may, nevertheless, drain through the passage 32 by traveling along the tortuous spiral path formed between the wall of the passage 38 and the body of the baffle member 34. The use of the rubber plug 38 at the time sealing compound is placed in the well 26 assures that the drain passage 32 will not be clogged by an inadvertent deposit of sealing compound in the mouth of the drain passage.

I claim as my invention:

A fitting for explosion-proof electrical systems which comprises, in combination, a hollow body having entrance, exit, and filling openings defined therein; a closure member for said filling opening; means defining a sealing well within said body between said entrance and exit and in such location to permit sealing compound to be placed therein through said filling opening; said sealing well being adapted to hold such sealing compound so that the latter will mutually isolate said entrance and exit; means defining a vertical drain passage through said body; said drain passage having its upper, inner terminus disposed at a level no higher than the level to which sealing compound is to be filled in said well, and disposed immediately beneath said filling opening, the axis of said vertical drain passage being substantially in line with said filling opening; a baffle member permanently located in said drain passage for allowing the draining of moisture but preventing the escape of hot gases and flames therethrough; the upper end of said baffle member being spaced below the upper terminus of said drain passage; and a resilient plug in the upper end of said drain passage and adapted to be removed after filling the well with sealing compound and prior to use of the fitting to prevent blockage of the drain passage when sealing compound is being introduced into said sealing well by pulling the same from said drain passage out said filling opening after the sealing compound has been introduced.

References Cited in the file of this patent
UNITED STATES PATENTS

| | | |
|---|---|---|
| 2,405,927 | Thornblom | Aug. 13, 1946 |
| 2,711,438 | Bissell | June 21, 1955 |